United States Patent [19]

Prusak

[11] Patent Number: 4,470,795
[45] Date of Patent: Sep. 11, 1984

[54] APPARATUS FOR MANUFACTURING A DISC RECORD PACKAGE

[75] Inventor: John J. Prusak, Indianapolis, Ind.

[73] Assignee: RCA Corporation, New York, N.Y.

[21] Appl. No.: 443,999

[22] Filed: Nov. 23, 1982

[51] Int. Cl.³ .............................................. B29C 3/00
[52] U.S. Cl. .................................. 425/384; 156/443; 206/312; 206/444; 264/322; 264/339; 425/394; 425/397; 425/520; 425/DIG. 38
[58] Field of Search ............... 425/810, DIG. 38, 384, 425/397, 339, 343, 520, 394; 264/339, 322; 206/313, 312, 444; 360/133; 156/204, 226, 227, 443, 475, 478, 479, 482, 483, 484, 485, 492

[56] References Cited

U.S. PATENT DOCUMENTS

| | | | |
|---|---|---|---|
| 3,899,277 | 8/1975 | Winter | 425/397 |
| 3,926,425 | 12/1975 | Pierce et al. | 156/443 |
| 4,124,427 | 11/1978 | Vecchiotti | 156/443 |
| 4,239,108 | 12/1980 | Coleman et al. | 206/312 |
| 4,263,634 | 4/1981 | Chenoweth | 206/444 |
| 4,304,621 | 12/1981 | Appoldt | 206/313 |
| 4,316,539 | 2/1982 | Torrington | 206/307 |

FOREIGN PATENT DOCUMENTS 800513  8/1958  United Kingdom ............... 206/313

Primary Examiner—Donald E. Czaja
Assistant Examiner—Michael McGurk
Attorney, Agent, or Firm—E. M. Whitacre; W. H. Meise; D. A. Kulkarni

[57] ABSTRACT

Apparatus for the manufacture of a video disc caddy sleeve comprising folding platens, an intermediate spacer plate with indentations on the leading edge, and a selective heating means. Spacer plate causes plastic sheet to bend in the middle while folding platens close to a folded up position. Indentations on the leading edge act to keep label, already adhered to plastic sheet, from tearing while sheet is being bent into a U-shaped enclosure.

4 Claims, 13 Drawing Figures

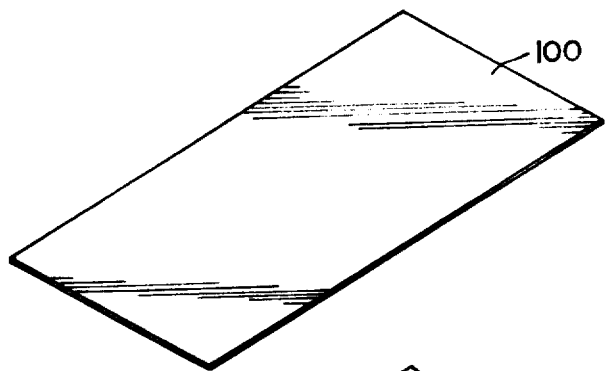
Fig. 3
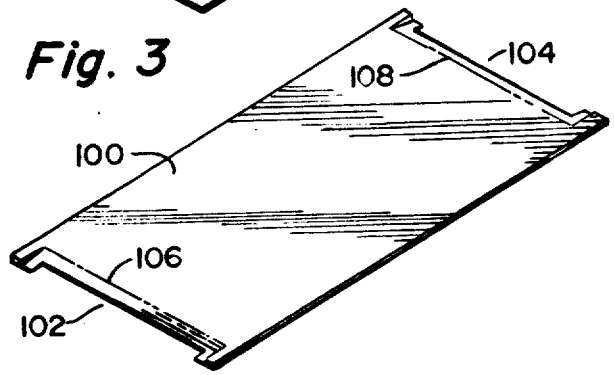
Fig. 4
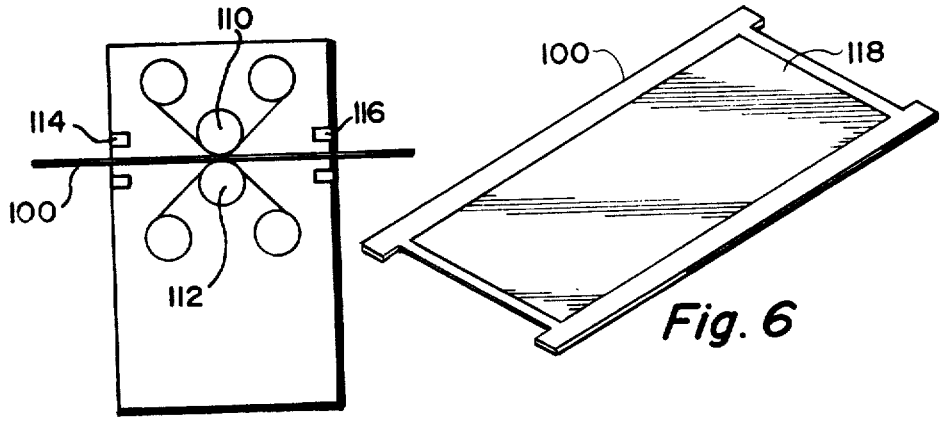
Fig. 5
Fig. 6

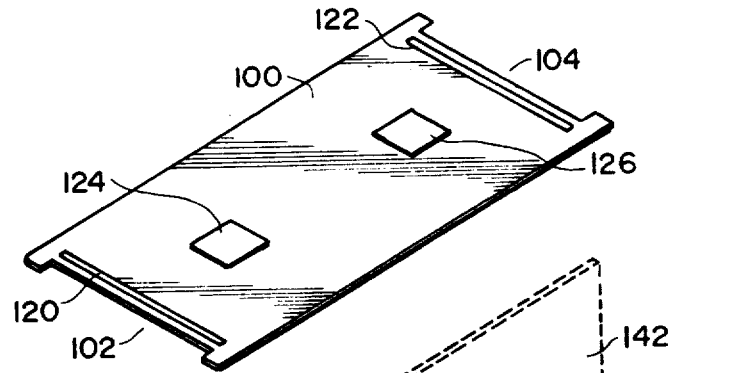
Fig. 7
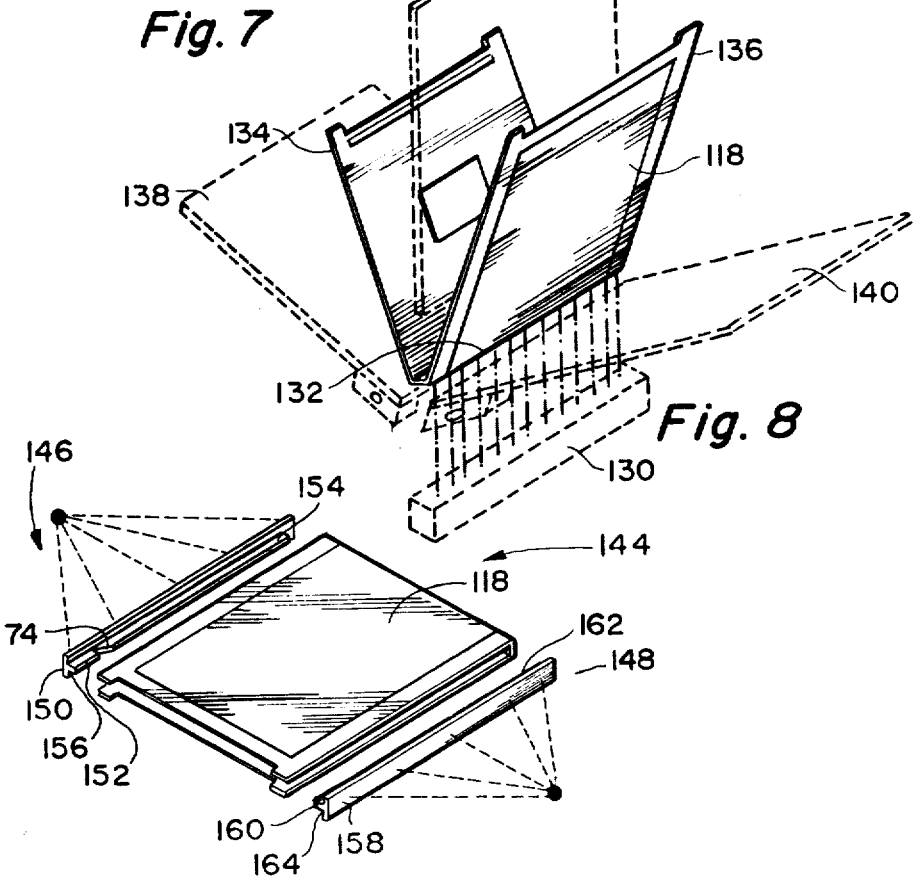
Fig. 8
Fig. 9

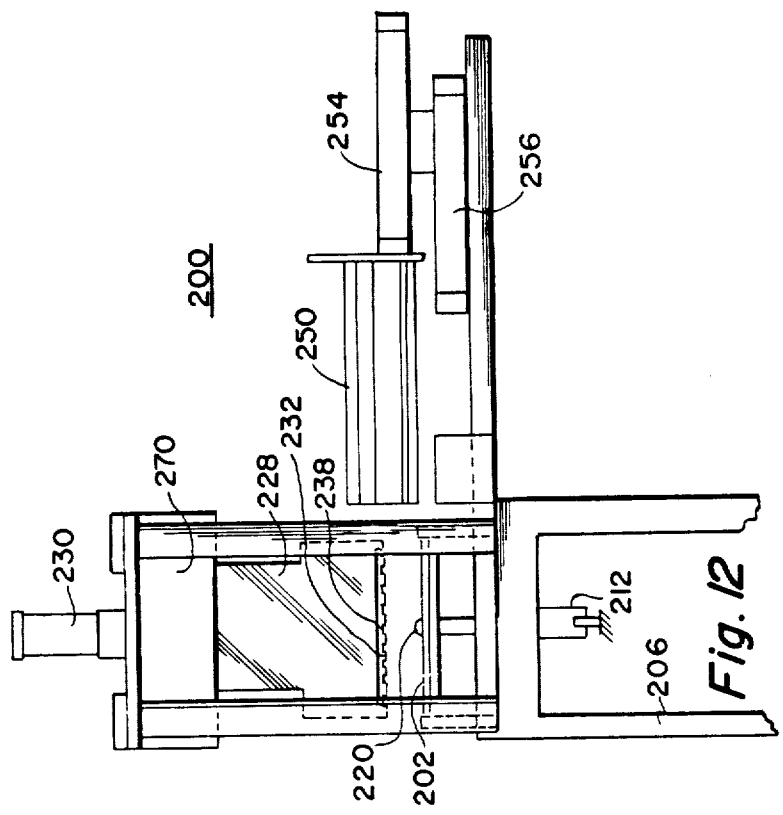
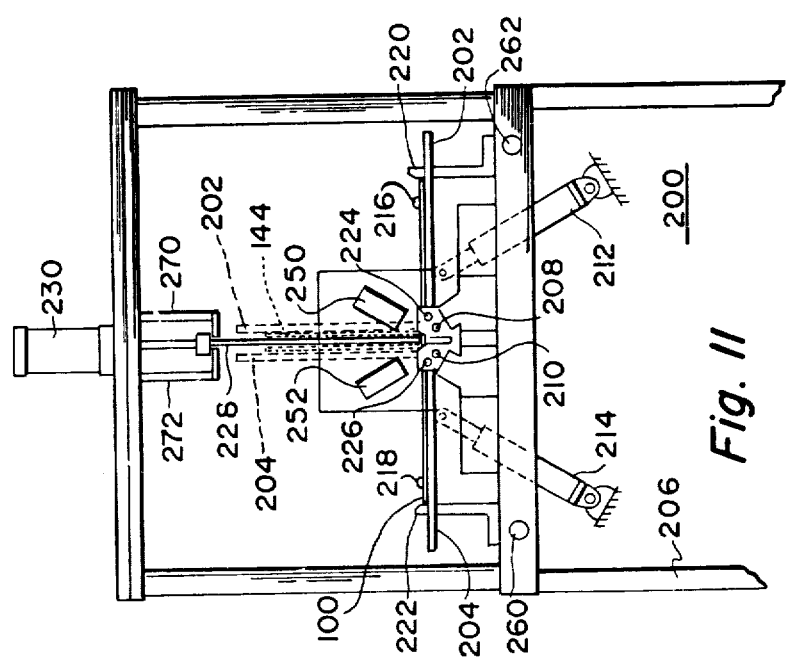

APPARATUS FOR MANUFACTURING A DISC RECORD PACKAGE

This invention generally relates to a record package, and more particularly, to a technique for manufacturing the record package outer sleeve.

In certain systems, picture and sound signals are stored on a disc record in the form of physical undulations in a continuous spiral track disposed on the record surface. The variations in electrical capacitance between an electrode disposed on a record engaging stylus and a conductive property of a turntable supported record are sensed as the physical undulations on the record surface pass beneath the stylus tip. The capacitive variations are converted into electrical signals suitable for application to a conventional television receiver.

It is beneficial to enclose a video record in a caddy which comprises a record retaining spine removably located within an outer sleeve. The record retaining spine has an opening in which a record is received to form a record/spine assembly. The record retaining spine is provided with a pair of spaced apart locking fingers disposed at the opposite edges thereof to releasably secure the spine to the sleeve. The caddy sleeve is covered with a wrap-around label containing program information and graphics. For record loading, a full caddy is inserted into an input slot provided in the player along a pair of caddy guide rails. A record extraction mechanism disposed in the player removes the record/spine assembly from the sleeve when the sleeve is withdrawn to leave the record/spine assembly inside the player resting on a set of record receiving pads. The retained record is then transferred by a record handling mechanism to a turntable for playback. For record retrieval, the record is transferred back to the receiving pads, and an empty jacket is reinserted into the player to recapture the record/spine assembly.

There are several alternative techniques for manufacturing the caddy sleeve. The caddy sleeve, shown in U.S. Pat. No. 4,239,108 (Coleman et al.), comprises a pair of injection molded halves which are ultrasonically welded together. U.S. Pat. No. 4,316,539 (Torrington) discloses an alternative design where the caddy sleeve consists of a pair of inexpensive panels securely mounted to a U-shaped, injection molded frame.

A concurrently-filed, copending U.S. patent application Ser. No. 443,998, of Turner et al., entitled "METHOD AND APPARATUS FOR MANUFACTURING DISC RECORD PACKAGE", discloses an improved technique for fabricating the caddy sleeve. The Turner et al. technique consists of heating the midsection of a flat plastic sheet, bending the plastic sheet at the heated midsection to form a U-shaped enclosure, and then closing two sides of the U-shaped enclosure to form the caddy sleeve. The caddy sleeve is then covered with a program label.

According to a further feature of the Turner et al. invention, an apparatus is disclosed for forming the U-shaped enclosure from a flat plastic sheet. The apparatus includes a pair of folding plates pivotally mounted to the apparatus housing about the respective one of a pair of spaced axes for motion between a spreadout position where the plates are substantially coplanar, and a folded-up position where the plates are juxtaposed to each other. The folded-up plates define a space corresponding to the exterior surfaces of the U-shaped enclosure. A substantially planar spacer plate is centrally mounted in the space formed by the juxtaposed plates. The exterior surfaces of the spacer plate define the interior surfaces of the U-shaped enclosure. The terminating portion of the spacer plate has a leading edge subject to engagement with the narrow intermediate section of a flat plastic sheet laid on the spreadout folding plates. The apparatus further includes a means for selectively heating the narrow intermediate section of the flat plastic sheet disposed on the spreadout plates. The apparatus has a means for folding the plates to cause the panel portions of the flat plastic sheet to bend about the heated intermediate section to form the U-shaped enclosure. The U-shaped enclosure is then sealed on two sides, and labeled to complete the assembly as previously indicated.

There are advantages to first applying a program label to a flat sheet and then folding it to form a U-shaped enclosure, as compared to first forming a U-shaped enclosure and then labeling it. However, a problem with this technique is that the program label has a tendency to develop tears as the labeled flat sheet is folded up to form a U-shaped enclosure.

The improvement to the Turner et al. caddy folding machine, in accordance with this invention, overcomes the above-mentioned problem of folding a labeled flat sheet. The spacer plate, pursuant to this invention, comprises surfaces extending inwardly from its body portion to the leading edge thereof to cause the heated plastic adjacent to the intermediate section to flow inwardly to permit a labeled plastic sheet to wrap around the spacer plate without the risk of damaging the problem label.

According to another feature of the invention, the leading edge of the spacer plate is equipped with a plurality of pits to further accommodate the inwardly flowing plastic during the folding operation.

In the drawings:

FIGS. 3-9 depict the sequence of operations utilized in fabricating the FIG. 2 caddy sleeve;

FIGS. 10-12 show a caddy folding machine, pursuant to this invention, for forming the U-shaped enclosure defining the caddy sleeve.

Figure 1:
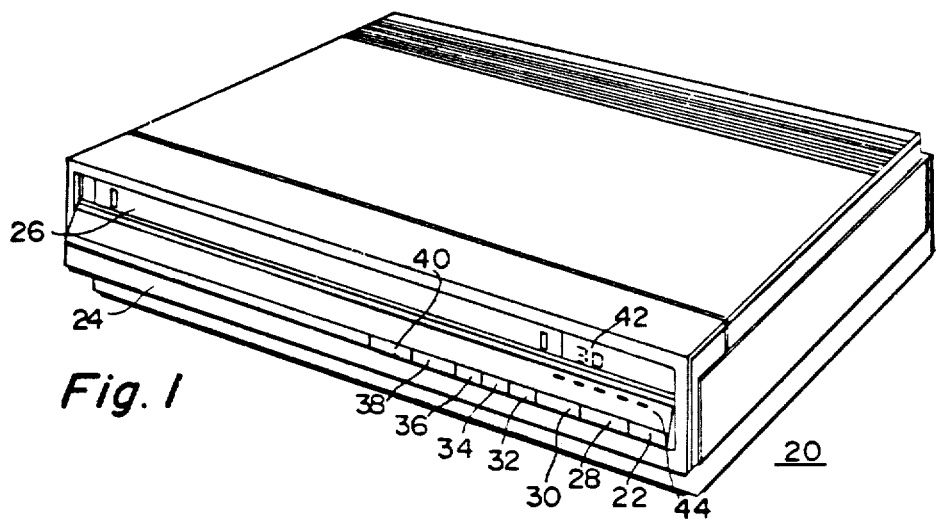
FIG. 1 is a video disc player suitable for use with a video disc caddy fabricated in accordance with the subject invention.
Figure 2:
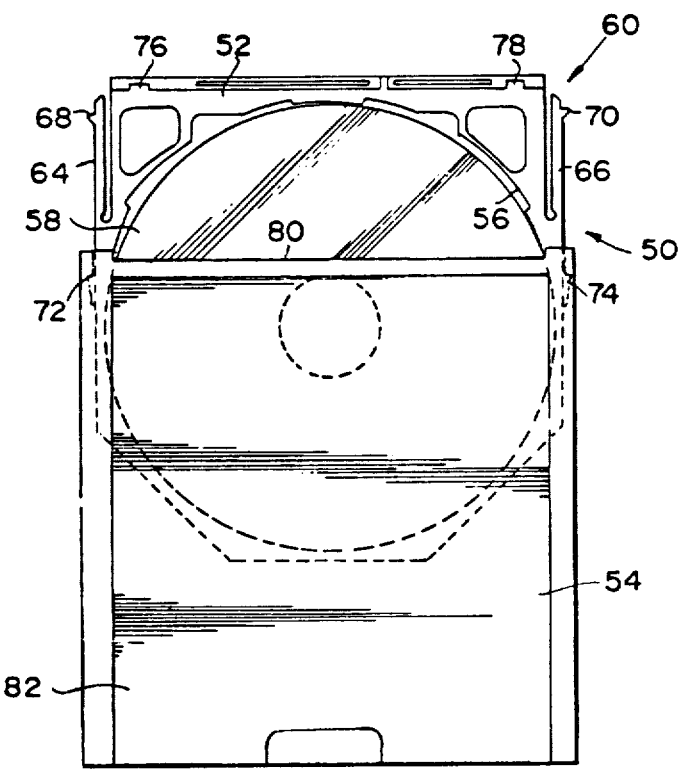
FIG. 2 illustrates the video disc caddy comprising a record retaining spine adapted for selective retention in an outer sleeve constructed according to this invention.

Shown in FIG. 1 is a video disc player 20 suitable for use with a video disc caddy made in accordance with the present invention. To play a disc, the player is turned on by pressing the "POWER" button 22 located on the front panel 24. The video disc caddy, illustrated in FIG. 2, is inserted into the player through a caddy input slot 26, and the caddy sleeve is then extracted leaving the enclosed record/spine assembly inside the player. The record is automatically deposited on the turntable, and played back through a conventional television receiver. At any point during playback, the viewer can reject the remainder of the record by depressing the "REJECT" button 28, or interrupt the program by activating the "PAUSE" button 30. Buttons 32 and 34 permit a non-visual rapid scan of the record in either direction. Buttons 36 and 38 allow a rapid visual search of the record in both directions. The player has a "CHANNEL A/B" button 40 to select any one of two audio channels in the event of a bilingual program disc. An LED indicator 42 shows the elapsed playing time. Various player functions — such as SIDE 1-2, CHANNEL A/B, STEREO — are indicated by a plurality of light indicators 44.

The video disc caddy 50, depicted in FIG. 2, consists of a planar injection-molded record retaining spine 52 removably enclosed in a flat outer sleeve 54 made in accordance with this invention. The retaining spine 52 has an opening 56 in which a centrally-apertured record 58 is received forming a record/spine assembly 60. Integrally molded with the spine 52 are spine locking fingers 64 and 66 for releasably securing the spine 52 in its sleeve 54. The spine locking fingers 64 and 66 are fitted with protruding elements 68 and 70 which are received in the respective recesses 72 and 74 provided in the sleeve 54 to hold the spine 52 in place. The spine 52 has cutouts 76 and 78 in which the respective spine latching members of a record extraction mechanism are received to secure the spine to the player, so that the record/spine assembly 60 is retained inside the player when the caddy sleeve 54 is withdrawn. The caddy sleeve 54 has a record access opening 80 in communication with a record enclosing cavity 82.

The novel construction of the caddy sleeve 54 will now be explained in conjunction with FIGS. 3-9. A flat extruded polystyrene sheet 100 is trimmed to size. Illustrative dimensions of the plastic sheet, in inches, are 0.070 thick × 12.690 wide × 28.165 long. Any suitable material, e.g., polystyrene, is extruded into a flat sheet which is either cut into individual pieces or stored in a roll form for the subsequent die cutting and trimming operations. The flat sheet 100 is die cut at both ends to form cutouts 102 and 104 for reception of the front wall of the spine 52 such that the front edge of the spine is flush with the front edge of the outer sleeve 54. The lead-in edges of the flat sheet 100 are beveled at both ends 106 and 108, as shown in FIG. 4, to facilitate insertion of the record/spine assembly 60 into the caddy sleeve 54. The bevels 106 and 108 are cold formed. The die cutting and beveling operations are performed simultaneously at a single station.

The recessed and beveled plastic sheet 100 is then cleaned by passing it through a set of cleaning rollers 110 and 112 depicted in FIG. 5. Any suitable cleaning cloth can be used— for example, wiping fabric made by 3M Company. The plastic sheet is passed through a set of antistatic bars 114 and 116 at both the feed end and the output end of the cleaning machine to get rid of any accumulated electrostatic charges.

The plastic sheet 100 is then covered on the side thereof opposite from the side having the beveled edges 106 and 108 with a heat-seal, wrap-around label 118 containing both the program information and the graphics. The label 118 is made from any suitable material (e.g., 60-70 lb. litho paper). To apply the program label 118, the label is accurately located on the plastic sheet 100 and then the label/plastic sheet assembly is passed between a set of heated rollers to cause the label to securely adhere to the plastic sheet.

A pair of lip seal pads 120 and 122 and center pads 124 and 126 are then applied to the plastic sheet 100 on the non-labeled side in the manner shown in FIG. 7. The lip pads 120 and 122 serve to prevent record scuffing and debris generation during record insertion and extraction. They also serve to keep dust and debris from entering into the record enclosing cavity 82. The center pads 124 and 126 protect the record 58 by providing soft sliding surfaces at the disc/caddy interfaces. The pads can be made from any suitable material— such as Sontara made by Dupont. The pads are covered with pressure sensitive adhesive on one side, and are die cut and firmly seated in place.

The heat from a pair of line-focus heaters 130 is applied to a narrow folding section 132 disposed between the panel portions 134 and 136 of the plastic sheet 100 for a preset time duration (e.g., 3 to 4 seconds) in the manner schematically shown in FIG. 8. The temperature of the plastic sheet 100 in the folding line region 132 is raised to about 325° F. A pair of water-cooled folding plates 138 and 140 fold the plastic sheet 100 at the heated folding line 132 to cause the panel portions 134 and 136 to wrap around a spacer plate 142 to define a U-shaped enclosure 144 illustrated in FIG. 9. The temperature of the water circulated through the folding plates 138 and 140 is chilled to approximately 55° F. The folding plates 138 and 140 are held in the folded-up position for about 4 to 5 seconds, and then shifted back to the flat position. The thickness of the spacer plate 142 defines the caddy internal clearance (e.g., 0.110±0.040 inches).

A pair of T-shaped rails 146 and 148 are ultrasonically welded to the enclosure 144 as diagrammatically shown in FIG. 9 to form the caddy sleeve 54. The T-shaped rail 146 has an edge wall 150 and an intermediate flange portion 152 extending substantially perpendicularly therefrom to define a pair of channels 154 and 156. The edge wall, the flange portion and the channel portions of the other T-shaped rail 148 are respectively identified by numerals 158, 160, 162 and 164. The side edges of the panel portions 134 and 136 are snugly received in the respective channels 154, 162 and 156, 164. The ultrasonic welder and the power supply are made by Branson Sonic Power Company, Model Nos. 871 and 187P, respectively. The T-rails are provided with recesses 72 and 74, as shown in FIG. 2, to releasably capture the record/spine assembly 60.

Figure 10:
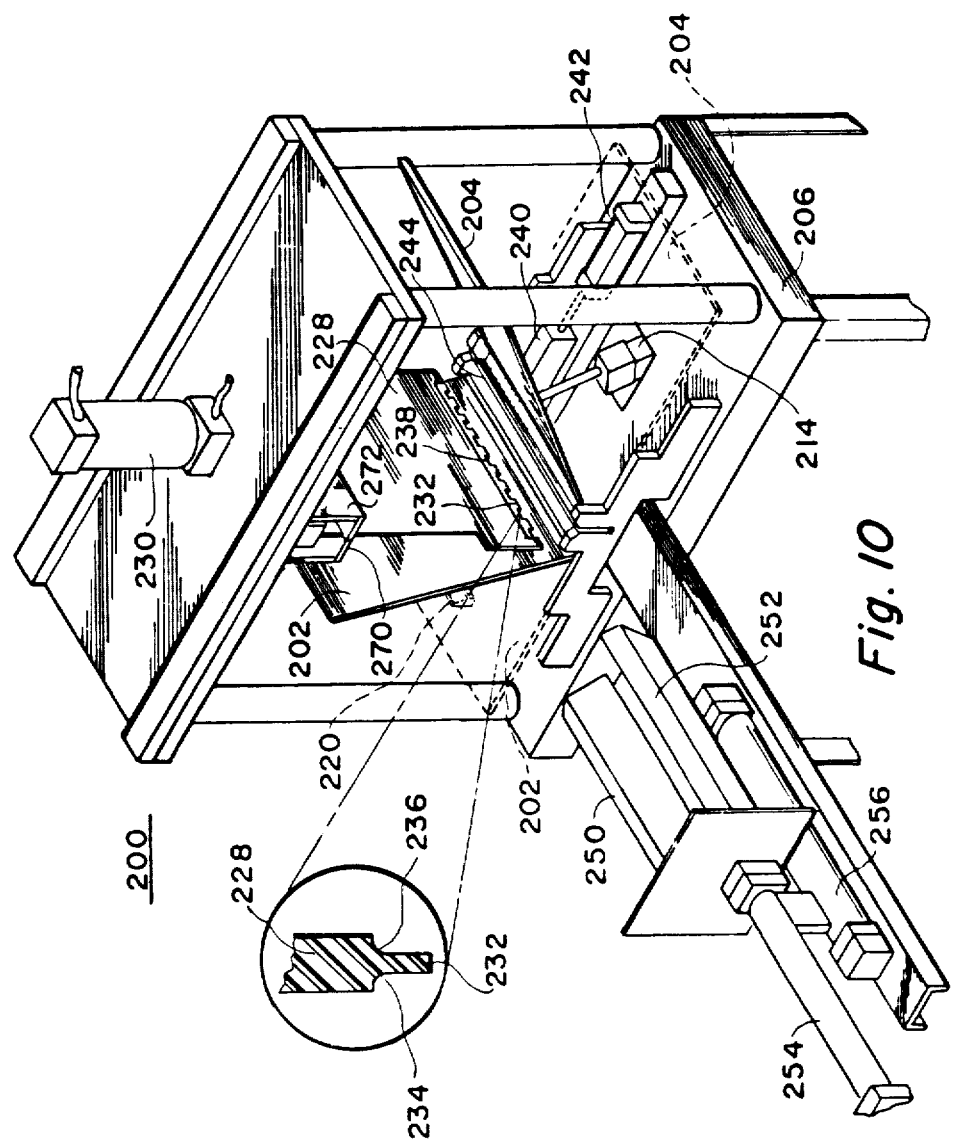

An apparatus 200 for fabricating the U-shaped enclosure 144, in accordance with this invention, will now be described in conjunction with FIGS. 10-12. The apparatus 200 includes a pair of folding plates 202 and 204 pivotally mounted to the housing 206 of the apparatus about a pair of axes 208 and 210. The folding plates 202 and 204 correspond to the plates 138 and 140 schematically shown in FIG. 8. The folding plates 202 and 204 are subject to motion between (1) a speadout position, shown by solid lines in FIG. 11, where the plates are substantially coplanar, and (2) a folded-up position, shown in phantom in the same FIGURE, where the plates are juxtaposed to each other. The spreadout plates 202 and 204 support the flat plastic sheet 100 disposed thereon with the labeled side of the plastic sheet facing the folding plates. The folded-up plates 202 and 204 define a space corresponding to the exterior surfaces of the U-shaped enclosure 144. The folding apparatus 200 is equipped with a pair of pneumatically operated cylinders 212 and 214 connected to the respective one of the folding plates 202 and 204 for selectively causing the motion of the plates between the spreadout position and the folded-up position. The air-operated cylinders 212 and 214 are manufactured by Ortman-Miller Company: Series—1A, Style—B, Bore—2 inches, and Stroke —6 inches.

The folding plates 202 and 204 are respectively fitted with end locators 216 and 218, shown in FIG. 11, to provide the front-to-back registration of the plastic sheet 100 laid on the spreadout plates. A pair of side locators 220 and 222 assure the correct side-to-side alignment of the plastic sheet 100.

The folding plates 202 and 204 are further provided with cooling channels through which cold water (e.g., 55° F.) is circulated to dissipate the heat to allow the heated plastic to set in the manner indicated later. The cooling water inlet ports are identified by numerals 224 and 226 in FIG. 11.

A substantially flat spacer plate 228 is centrally mounted in the space defined by the folded-up plates 202 and 204. The exterior surfaces of the spacer plate 228 define the interior surfaces of the U-shaped enclosure 144. The spacer plate 228 is indicated by the numeral 142 in FIG. 8. The housing 206 is provided with an air-operated cylinder 230 for selectively displacing the spacer plate 228 between a retracted position, shown in FIG. 10, where its leading edge 232 is spaced from the plastic sheet 100 and an advanced position depicted in FIG. 11, where the leading edge is in engagement with the plastic sheet. The air-operated cylinder 230 is manufactured by Ortman-Miller Company: Series—1A, Style—H, Bore—3.25 inches and Stroke—4.5 inches.

Figure 13:
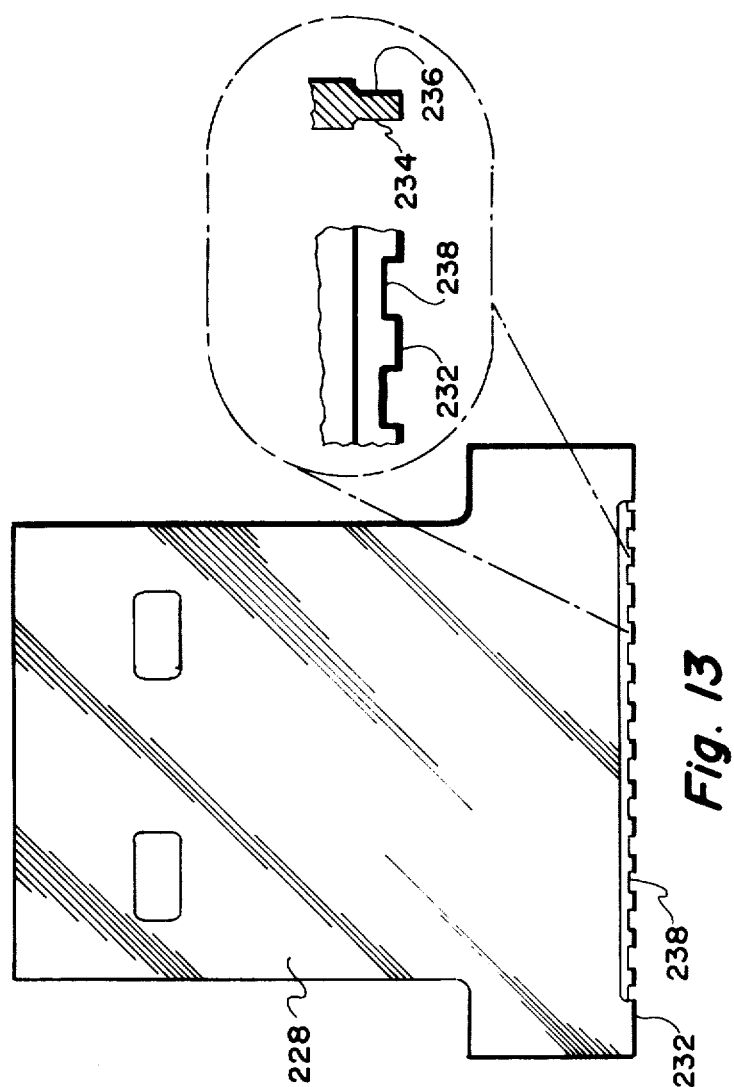
FIG. 13 shows certain construction details of the caddy folding machine of FIGS. 10-12.

The terminating portion of the spacer plate 228, in accordance with this invention, is provided with surfaces 234 and 236 extending inwardly from the body of the spacer plate to the leading edge 232 thereof in the manner shown in FIG. 13. The leading edge 232 is further equipped with a plurality of slots or depressions 238. The constricted leading edge 232 of the spacer plate 228 and the indentations 238 provided therein cause the hot plastic in the region of the narrow intermediate section 132 to flow inwardly when the plastic sheet 100 is bent around the spacer plate so that the plastic sheet can be folded into the U-shaped enclosure without damaging the program label 118. Illustrative dimensions of the spacer plate 228 are as follows: body thickness=0.110 inches, slot width=0.312 inches, slot height=0.058 inches, slot pitch=.0655 inches, and constricted portion height=0.244 inches.

A bottom forming plate 240 is reciprocably mounted to the housing 206 for motion between a withdrawn position and an extended position in response to the actuation of a pneumatically-operated cylinder 242. The air-operated cylinder 242 is manufactured by Ortman-Miller Company: Series—1A, Style—D, Bore—1.5 inches, and Stroke—1.5 inches. The bottom forming plate 240 has a die portion 244 which, when the forming plate is extended, supports the bottom of the U-shaped enclosure 144 during the folding operation.

The folding machine 200 includes a pair of reciprocably-mounted, high intensity, infrared, elliptical-reflector, line-focus heaters 250 and 252 for selectively heating the respective one of a pair of regions interposed between the narrow intermediate section 132 and the respective panel portions 134 and 136 of the plastic sheet 100 disposed on the spreadout folding plates 202 and 204. The line-focus heaters 250 and 252 generate highly-concentrated radiant heat flux density along thin lines at the external focal axes of the respective highly polished aluminum elliptical reflectors. The heating elements of the line-focus heaters 250 and 252 comprise high temperature tungsten filaments enclosed in clean quartz envelopes. The vertical positions of the line-focus heaters 250 and 252 are adjusted to focus the heat at the respective regions on the plastic sheet 100. The heaters 250 and 252 are made by Research Inc., Model No. 5193.

The folding machine 200 is provided with a set of air-operated cylinders 254 and 256 which, when actuated, advance the line-focus heaters 250 and 252 to a position over the folding section 132 of the plastic sheet 100. The air-operated cylinders 254 and 256 are manufactured by Origa Company: Model—P12, Bore—40 millimeters, and Stroke—14 inches. The heaters 250 and 252 are then turned on for a preset time duration (e.g., 3 to 4 seconds) to heat the folding line region 132 to the desired temperature (e.g., 325° F.). The air-operated cylinders 254 and 256 are then reactivated to retract the heaters 250 and 252 out of the way.

To form the U-shaped enclosure 144, the flat plastic sheet 100 is accurately positioned on the spreadout plates 202 and 204 between the respective end and side locators 216, 218, 220 and 222 with the labeled side thereof facing the folding plates. When the folding machine 200 is activated by simultaneously depressing dual palm buttons 260 and 262, the caddy folding machine goes through the following sequence of operation.

The air-operated cylinder 242 is activated to extend the bottom forming plate 240 such that the die portion 244 is beneath the folding line 132 of the plastic sheet 100.

The line-focus heaters 250 and 252 are advanced to a location over the folding region 132.

The line-focus heaters 250 and 252 are turned on for a preset time interval (e.g., 3 to 4 seconds) to heat the folding line area 132 of the plastic sheet 100 to about 325° F.

The line-focus heaters 250 and 252 are retracted out of the way.

The spacer plate 228 is advanced by the air-operated cylinder 230 such that the leading edge 232 of the spacer plate is in engagement with the folding line 132 of the plastic sheet 100.

The air-operated cylinders 212 and 214 are engergized to cause the water-cooled folding plates 202 and 204 to fold up the panel portions 134 and 136 against the center plate 230 to form a U-shaped enclosure.

The water-cooled folding plates 202 and 204 hold the panel portions 134 and 136 against the spacer plate 230 for a preset time duration (e.g., 4 to 5 seconds) to cause the heated area of the plastic to cool off and set.

The folding wings 202 and 204 are moved back to the spreadout position.

The bottom forming plate 240 is retracted out of the way.

The air-operated cylinder 232 is activated to lift the spacer plate 230. When the spacer plate 230 is raised, a pair of kick-off bars 270 and 272 strip the caddy enclosure 144 from the spacer plate. The caddy enclosure 144 drops down through the center clearance onto a conveyor (not shown) for transportation to the next station.

An advantage of heating the plastic sheet from the top, instead of the bottom is that any deformation of the plastic sheet due to heat is on the inside of the caddy enclosure where it is not visible to the eye.

What is claimed is:

1. Apparatus for fabricating a U-shaped enclosure from a flat plastic sheet comprising a narrow intermediate section interposed between a pair of panel portions; said flat plastic sheet having a wrap-around label attached to one side thereof; said apparatus including a pair of folding plates pivotally mounted to the apparatus housing for motion between a spreadout position where said folding plates are substantailly coplanar and a folded-up portion where said plates are juxtaposed to each other; said folded-up plates defining a space corresponding to the exterior surfaces of said U-shaped enclosure; said apparatus further having a substantially planar spacer plate being centrally mounted in said space defining said U-shaped enclosure; the exterior surfaces of said spacer plate defining the interior surfaces of said U-shaped enclosure; the terminating portion of said spacer plate having a leading edge subject to engagement with the narrow intermediate section of a flat plastic sheet laid on said spreadout folding plates with said label side thereof facing said folding plates; said apparatus including means for selectively heating said narrow intermediate section of said flat plastic sheet; said apparatus additionally having means for folding said plates to cause said flat plastic sheet to wrap around said spacer plate to form said U-shaped enclosure; wherein the improvement comprises providing a plurality of depressions in said leading edge of said spacer plate to cause the heated plastic near said intermediate section to flow inward so that said plastic sheet can be wrapped around said spacer plate without damaging said label.

2. The apparatus as set forth in claim 1 wherein said terminating portion of said spacer plate has surfaces extending inwardly from the body portion of said spacer plate to said leading edge thereof to further facilitate the inward flow of plastic as the caddy sheet is folded up.

3. Apparatus for fabricating a U-shaped enclosure from a flat plastic sheet comprising a narrow intermediate setion interposed between a pair of panel portions; said flat plastic sheet having a wrap-around label attached to one side thereof; said apparatus including a pair of folding plates pivotally mounted to the apparatus housing for motion between a spreadout position where said folding plates are substantially coplanar and a folded-up portion where said plates are juxtaposed to each other; said folded-up plates defining a space corresponding to the exterior surfaces of said U-shaped enclosure; said apparatus further having a substantially planar spacer plate being centrally mounted in said space defining said U-shaped enclosure; the exterior sufaces of said spacer plate defining the interior surfaces of said U-shaped enclosure; the terminating portion of said spacer plate having a leading edge subject to engagement with the narrow intermediate section of a flat plastic sheet laid on said spreadout folding plates with said label side thereof facing said folding plates; said apparatus including means for selectively heating said narrow intermediate section of said flat plastic sheet; said apparatus additionally having means for folding said plates to cause said flat plastic sheet to wrap around said spacer plate to form said U-shaped enclosure; wherein the improved terminating portion of said spacer plate comprises surfaces extending inwardly from the body portion of said spacer plate to said leading edge thereof to cause the heated plastic in the region of said intermediate section to flow inward to allow a labeled plastic sheet to wrap around said spacer plate without damaging said label.

4. The apparatus as defined in claim 3 wherein said leading edge of said spacer plate is further equipped with a multiplicity of indentations to further facilitate inward flow of the plastic when the plastic sheet is bent around the spacer plate.

* * * * *